United States Patent
Kang et al.

(10) Patent No.: US 8,739,927 B2
(45) Date of Patent: Jun. 3, 2014

(54) GYPSUM PANEL HAVING OUTSTANDING SOUND-ABSORBING PROPERTIES AND A PRODUCTION METHOD THEREFOR

(75) Inventors: Gil-Ho Kang, Daejeon (KR); Heon-Sung Kang, Cheongju-si (KR); Seong-Moon Jung, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/877,965

(22) PCT Filed: Oct. 6, 2011

(86) PCT No.: PCT/KR2011/007416
§ 371 (c)(1),
(2), (4) Date: Apr. 5, 2013

(87) PCT Pub. No.: WO2012/047045
PCT Pub. Date: Apr. 12, 2012

(65) Prior Publication Data
US 2013/0199872 A1    Aug. 8, 2013

(30) Foreign Application Priority Data

Oct. 7, 2010 (KR) .................. 10-2010-0097974

(51) Int. Cl.
*E04B 1/84* (2006.01)
*E04B 1/82* (2006.01)

(52) U.S. Cl.
USPC .................................. 181/294; 181/293

(58) Field of Classification Search
USPC ......... 181/294, 293, 290, 291, 292, 288, 284, 181/295; 52/144, 145
See application file for complete search history.

(56) References Cited

U.S. PATENT DOCUMENTS

| | | | | |
|---|---|---|---|---|
| 2,096,233 A | * | 10/1937 | Ericson | 181/290 |
| 2,326,763 A | * | 8/1943 | Crandell | 428/138 |
| 2,413,568 A | * | 12/1946 | Hurley | 181/291 |
| 2,459,121 A | * | 1/1949 | Willey et al. | 181/293 |
| 2,668,123 A | * | 2/1954 | Copeland | 427/270 |
| 2,694,025 A | * | 11/1954 | Games et al. | 428/102 |
| 2,838,806 A | * | 6/1958 | Sabine | 52/145 |
| 3,215,225 A | * | 11/1965 | Kirschner | 181/290 |
| 3,269,484 A | * | 8/1966 | Lighter | 181/290 |

(Continued)

FOREIGN PATENT DOCUMENTS

JP    2001132132       5/2001
JP    2004191445 A     7/2004

(Continued)

OTHER PUBLICATIONS

International Search Report mailed Apr. 12, 2012 for PCT/KR2011/007416, citing the above reference(s).

*Primary Examiner* — Edgardo San Martin
(74) *Attorney, Agent, or Firm* — Lowe Hauptman & Ham, LLP

(57) ABSTRACT

Disclosed is a gypsum panel having outstanding sound-absorbing properties whereby it is possible to impart various aesthetic effects while also having outstanding sound-absorbing effects. The gypsum panel having outstanding sound-absorbing properties according to the present invention comprises: a perforated gypsum body having a plurality of holes, and a sound-absorbing cover layer which is attached to one side of the gypsum body and which has through-holes of a smaller size than the holes, wherein the mean diameter of the through-holes is between 10 and 40 μm.

13 Claims, 2 Drawing Sheets

(56) References Cited

U.S. PATENT DOCUMENTS

| | | | |
|---|---|---|---|
| 3,312,304 A * | 4/1967 | Philipp et al. | 181/290 |
| 4,040,213 A * | 8/1977 | Capaul | 52/145 |
| 4,317,503 A * | 3/1982 | Soderquist et al. | 181/290 |
| 4,347,912 A * | 9/1982 | Flocke et al. | 181/286 |
| 5,125,475 A * | 6/1992 | Ducharme et al. | 181/284 |
| 5,202,174 A * | 4/1993 | Capaul | 428/138 |
| 2005/0211500 A1* | 9/2005 | Wendt et al. | 181/295 |
| 2007/0102237 A1* | 5/2007 | Baig | 181/290 |
| 2007/0137926 A1* | 6/2007 | Albin et al. | 181/290 |
| 2007/0186493 A1* | 8/2007 | Baig | 52/144 |

FOREIGN PATENT DOCUMENTS

| | | |
|---|---|---|
| JP | 3140443 U | 3/2008 |
| KR | 200367315 | 11/2004 |
| KR | 100654685 | 12/2006 |
| KR | 20070104151 A | 10/2007 |

* cited by examiner

GYPSUM PANEL HAVING OUTSTANDING SOUND-ABSORBING PROPERTIES AND A PRODUCTION METHOD THEREFOR

TECHNICAL FIELD

The present invention relates to a gypsum panel, and more particularly, to a gypsum panel having outstanding sound-absorbing properties in which a sound-absorbing cover layer having invisible micro through-holes is attached to a gypsum body having holes, thereby maximizing sound-absorbing effects while imparting aesthetically pleasing appearances.

BACKGROUND ART

In general, building panels for interior and exterior walls or ceilings of buildings are formed of incombustible materials that do not release toxic gases when a fire breaks out. One of typical incombustible panels is a gypsum panel.

The gypsum panel may be classified into a board type and a tile type. The board type gypsum panel is used together with a finishing material such as paints or wallpaper. On the other hand, the tile type gypsum panel is used together with a finished tile.

Recently, attempts have been made to impart sound-absorbing performance to such a gypsum panel.

Gypsum panels having sound-absorbing properties can be divided into three types. The first type is a porous type made of glass, wool, rock wool, or vegetable fibers, the second type is a plate vibration type made of fiber plates or gypsum boards, and the third type is a resonator type made of gypsum cement having a plurality of holes and having excellent sound-absorbing properties at a specific frequency.

Among these gypsum panels, as domestic gypsum panels currently used in practice, the gypsum panel made of gypsum cement having holes is partly used, and the gypsum panel having a porous structure using rock wool is mainly used.

The gypsum panel made of gypsum cement having holes has an advantage in that sound-absorbing properties are excellent, and a problem in that it is difficult to clean when used for a long period of time due to contamination of the holes.

On the other hand, the gypsum panel having a porous structure using rock wool is fragile due to poor strength as compared with the gypsum panel made of gypsum cement having holes, and its sound-absorbing frequency band is mainly a high frequency band of 1,000 Hz or more. As such, this gypsum panel does not selectively absorb sound waves at a low frequency band of 200 Hz to 1,600 Hz at which absorption of sound is actually required.

DISCLOSURE

Technical Problem

An aspect of the present invention is to provide a gypsum panel having outstanding sound-absorbing properties, capable of maximizing sound-absorbing effects by attaching a sound-absorbing cover layer having invisible micro through-holes to a perforated gypsum body having a plurality of holes.

Another aspect of the present invention is to provide a gypsum panel having outstanding sound-absorbing properties while providing an aesthetically pleasing appearance.

Another aspect of the present invention is to provide a gypsum panel having outstanding sound-absorbing properties, which is designed to effectively absorb sound waves of a high frequency band as well as a low frequency band.

Technical Solution

In accordance with one aspect of the present invention, a gypsum panel having outstanding sound-absorbing properties includes: a perforated gypsum body having a plurality of holes; and a sound-absorbing cover layer which is attached to one side of the gypsum body and which has through-holes of a smaller size than the holes, wherein the through-holes have an average diameter of 10 and 40 μm.

Here, the sound-absorbing cover layer may be a non-woven fabric formed of at least one of glass fiber, polyester fiber, and pulp.

The gypsum body may include a gypsum board and a finishing material attached to one or both sides of the gypsum board.

The gypsum body may be a finished tile.

The holes may have an average diameter of 0.5 mm to 20 mm.

The sound-absorbing cover layer may include a finishing layer having a pattern printed on an outer surface thereof.

The gypsum panel may have an air permeability of 100 $L/m^2/s$ to 2,000 $L/m^2/s$ at 200 Pa.

The gypsum panel may be constructed such that the sound-absorbing cover layer attached at one side thereof to one side of the gypsum body is disposed at the other side thereof to face a ceiling or a wall of a building.

In accordance with another aspect of the present invention, a method of manufacturing a gypsum panel having outstanding sound-absorbing properties includes: preparing a perforated gypsum body having a plurality of holes; and attaching a sound-absorbing cover layer to one side of the gypsum body having through-holes of a smaller size than the holes, wherein the through-holes have an average diameter of 10 nm to 40 μm, and the holes have an average diameter of 0.5 mm to 20 mm.

The sound-absorbing cover layer may be a non-woven fabric formed of at least one of glass fiber, polyester fiber, and pulp.

The method may further include printing a pattern on an outer surface of the sound-absorbing layer to form a finishing layer after attaching the sound-absorbing layer.

Advantageous Effects

The gypsum panel having outstanding sound-absorbing properties according to the present invention can maximize sound-absorbing effects by attaching the sound-absorbing cover layer having invisible micro through-holes to the perforated gypsum body having a plurality of holes.

In addition, the gypsum panel may provide aesthetically pleasing appearances by printing a pattern on the sound-absorbing cover layer in various ways.

Further, in the gypsum panel according to the present invention, since the sound-absorbing cover layer is provided with through-holes having a smaller micro size than the holes, it is easy to clean the gypsum panel although dust or foreign materials stick to the gypsum panel.

BEST MODE

Figure 1:
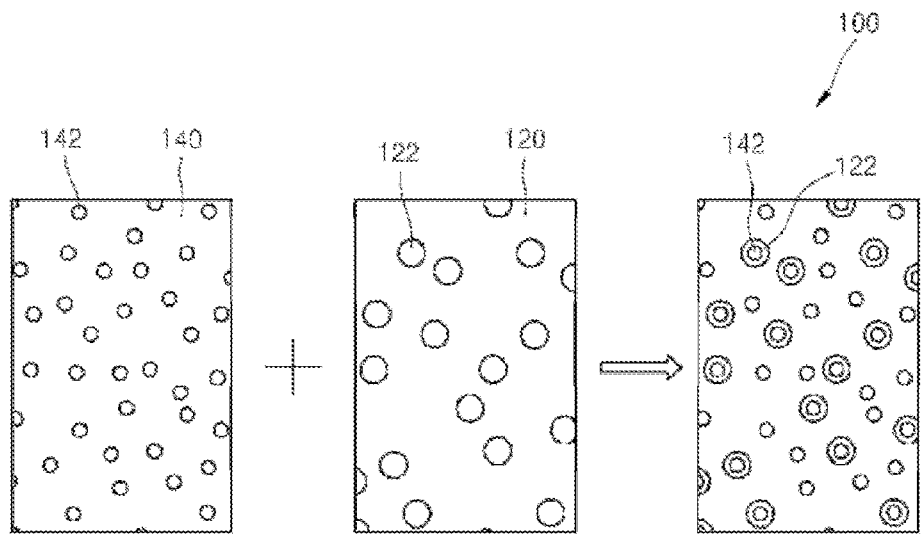
FIG. 1 is a schematic plan view of a gypsum panel having outstanding sound-absorbing properties according to one embodiment of the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the invention by those skilled in the art. The scope of the invention is defined only by the claims. Like components will be denoted by like reference numerals throughout the specification.

Now, a gypsum panel having outstanding sound-absorbing properties according to one embodiment of the present invention will be described in detail with reference to the accompanying drawings.

FIG. 1 is a schematic plan view of a gypsum panel having outstanding sound-absorbing properties according to one embodiment of the present invention.

Referring to FIG. 1, a gypsum panel 100 according to one embodiment includes a gypsum body 120 and a sound-absorbing cover layer 140.

As the gypsum body 120, a perforated type gypsum body having a plurality of holes 122 through which sound waves and air pass is used. Here, the holes 122 may be formed so as to pass through opposite sides of the gypsum body 120, and be randomly distributed on the gypsum body 120. Each hole 122 may be formed with an average diameter of 0.5 mm to 20 mm.

The gypsum body 120 may be molded into a plate shape by adding water, sawdust and perlite to calcined gypsum.

Although not shown in detail in the drawings, the gypsum body 120 may include a gypsum board and a finishing material attached to one or both sides of the gypsum board. Paint or wallpaper may be used as the finishing material. Alternatively, a finished tile may be used as the gypsum body 120.

The sound-absorbing cover layer 140 has a plurality of through-holes 142, through which sound waves and air pass, and is attached to one side of the gypsum body 120. Here, the through-holes 142 may be formed to pass through opposite sides of the sound-absorbing cover layer 140, and may be randomly distributed on the sound-absorbing cover layer 140.

The gypsum body 120 and the sound-absorbing cover layer 140 may have, for instance, the same area, and be laminated together.

The sound-absorbing cover layer 140 may be a non-woven fabric having the through-holes 142 of a constant size and formed of at least one of glass fiber, polyester fiber, and pulp.

Figure 2:
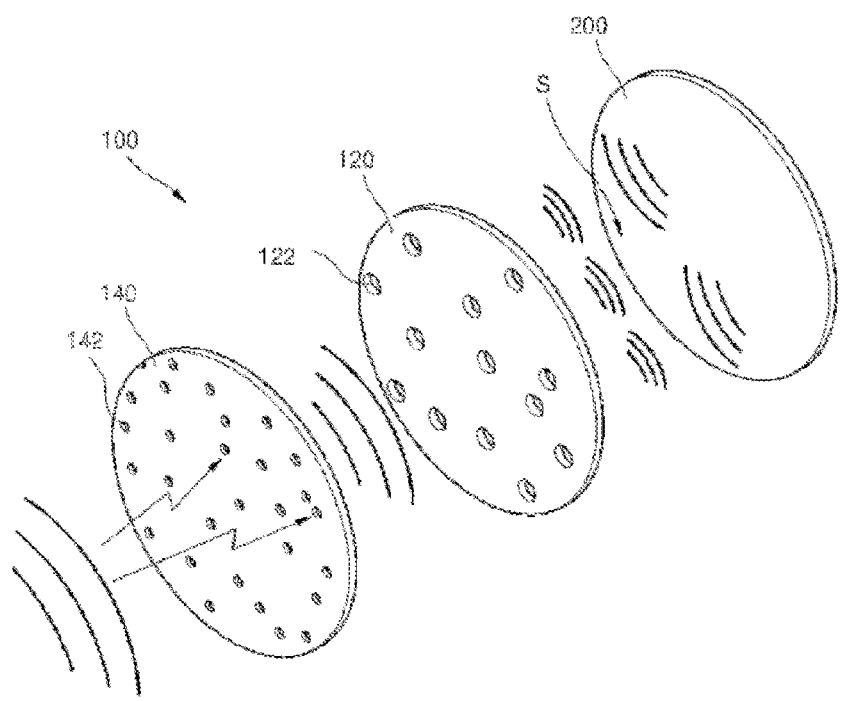
FIG. 2 is a view illustrating a sound-absorbing or sound-insulating principle of the gypsum panel having outstanding sound-absorbing properties according to the embodiment of the present invention.

Although not shown in detail in the drawings, the sound-absorbing cover layer 140 may further include a finishing layer (not shown) on an outer surface of which a pattern is printed. For example, the finishing layer may be wallpaper or paint. Here, as shown in FIG. 2, it is advantageous to finely form the through-holes 142 invisible to the naked eye in order to provide aesthetic appearances by forming the finishing layer in such a way that the pattern is printed on the surface of the sound-absorbing cover layer 140 formed of non-woven fabrics by various methods.

Alternatively, when forming the sound-absorbing cover layer 140, a pattern may be directly printed by partly coating the non-woven fabrics with a polyvinyl chloride (PVC) sol. In this case, there is no need to form the finishing layer.

Particularly, to effectively absorb sound waves of a low frequency band of 500 Hz or less in the gypsum panel 100, the through-holes 142 of the sound-absorbing cover layer 140 are preferably formed to have an average diameter of 10 μm to 40 μm, and more preferably 15 μm to 30 μm.

If the average diameter of the through-holes 142 is less than 10 μm, the amounts of sound waves and air passing through the sound-absorbing cover layer 140 can be reduced due to too low air permeability, and thus there is a risk of reduction in sound absorption rate. If the average diameter of the through-holes 142 is more than 40 μm, the sound absorption rate can be reduced due to excessively high air permeability.

Here, to maintain the average diameter of the through-holes 142 at the level of 10 μm to 40 μm, the through-holes 142 having a diameter of 50 μm or less are preferably designed to cover 60% or more of the whole through-holes 142 of the sound-absorbing cover layer 140.

The gypsum panel 100 having the aforementioned configuration has an air permeability of 100 L/m$^2$/s to 2000 L/m$^2$/s at 200 Pa.

In the present embodiment, the gypsum panel having a combination of the porous type and the resonator type structure is provided. The gypsum panel of this embodiment can effectively absorb low frequency sound waves as well as high frequency sound waves, thereby maximizing sound-absorbing properties. Furthermore, the gypsum panel can impart aesthetic appearances by printing the pattern on the surface of the sound-absorbing cover layer 140.

Further, in the gypsum panel according to the present embodiment, since the through-holes formed in the sound-absorbing cover layer are very finely formed to have an average diameter of 10 μm to 40 μm, a probability of foreign materials such as dust being attached into the through-holes is reduced, thereby facilitating cleaning of the gypsum panel.

The sound-absorbing principle of the gypsum panel according to the embodiment of the present will be described with reference to the accompanying drawings.

FIG. 2 is a view illustrating a sound-absorbing or sound-insulating principle of the gypsum panel having outstanding sound-absorbing properties according to the embodiment of the present invention.

Referring to FIG. 2, the gypsum panel 100 having outstanding sound-absorbing properties according to the embodiment of the present invention is constructed on the ceiling or wall 200 of a building to be separated a predetermined distance therefrom.

Particularly, the gypsum panel 100 is preferably constructed such that the sound-absorbing cover layer 140 is attached to one side of the gypsum body 120 at one side thereof, and that the other side thereof is disposed to face the ceiling or wall 200 of the building. With this construction, it is possible to realize various designs on the surface of the sound-absorbing cover layer 140.

Here, when indoor sound waves and air enter the sound-absorbing cover layer 140 of the gypsum panel 100, some of the indoor sound waves and air are absorbed by or reflected from the surface of the sound-absorbing cover layer 140, and the other passes through the holes 122 of the gypsum body 120 via the through-holes 142 of the sound-absorbing cover layer 140. In this case, the other indoor sound waves and air passing through the holes 122 are offset by a resonant phenomenon between the gypsum body 120 and the ceiling, thereby realizing sound adsorption.

EXAMPLES

Now, the construction and operation of the present invention will be described in more detail with reference to examples. However, it should be noted that these examples are provided for illustrative purposes and are not to be construed in any way as limiting the present invention.

Description of details apparent to those skilled in the art will be omitted for clarity.

1. Method of Manufacturing Gypsum Panel

In the present examples, each gypsum panel was manufactured by attaching a sound-absorbing layer having through-holes to a gypsum body having holes.

In Examples 1 to 3, the sound-absorbing layers were made of glass fibers (average diameter of 15 μm, available from HANKUK CARBON Co. Ltd.), wherein the through-holes were formed to have average diameters of 19.9 μm, 21.9 μm, and 36.7 μm, respectively, and the holes were formed to have an average diameter of 10 mm. In Comparative Example 1, the through-holes in the sound-absorbing layer were formed to have an average diameter of 43.0 μm, and the holes were formed to have an average diameter of 10 mm.

In Examples 4 to 6, the sound-absorbing layers were formed using polyester fibers (average diameter of 15 μm, available from HANKUK CARBON Co. Ltd.), wherein the through-holes were formed to have average diameters of 19.9 μm, 21.9 μm, and 36.7 μm, respectively, and the holes were formed to have an average diameter of 10 mm. In Comparative Example 2, the through-holes in the sound-absorbing layer were formed to have an average diameter of 43.0 μm, and the holes were formed to have an average diameter of 10 mm.

Further, in Examples 7 to 9, the sound-absorbing layers were made using pulp, wherein the through-holes were formed to have average diameters of 19.9 μm, 21.9 μm, and 36.7 μm, respectively, and the holes were formed to have an average diameter of 10 mm. In Comparative Example 3, the through-holes in the sound-absorbing layer were formed to have an average diameter of 43.0 μm, and the holes were formed to have an average diameter of 10 mm.

2. Results of Measuring Sound Absorption Rate

Table 1 shows results of measuring air permeability and average sound absorption rate according to Examples 1 to 9 and Comparative Examples 1 to 3.

TABLE 1

| | Average Size of Through-Holes (μm) | Air Permeability (L/m$^2$/s at 200 Pa) | Averege Sound Absorption Rate (at 200 to 1,600 Hz) |
| --- | --- | --- | --- |
| Example 1 | 19.9 | 500 | 0.64 |
| Example 2 | 21.9 | 550 | 0.55 |
| Example 3 | 36.7 | 1,617 | 0.52 |
| Comparative Example 1 | 43.0 | 3,690 | 0.43 |
| Example 4 | 19.9 | 455 | 0.63 |
| Example 5 | 21.9 | 472 | 0.59 |
| Example 6 | 36.7 | 1,825 | 0.53 |
| Comparative Example 2 | 43.0 | 2,520 | 0.48 |
| Example 7 | 19.9 | 375 | 0.57 |
| Example 8 | 21.9 | 412 | 0.55 |
| Example 9 | 36.7 | 1,895 | 0.42 |
| Comparative Example 3 | 43.0 | 2,322 | 0.39 |

Referring to Table 1, when the through-holes in the sound-absorbing layers formed of glass fibers were formed to have average diameters of 19.9 μm, 21.9 μm, and 36.7 μm, respectively, as in Examples 1 to 3, the air permeabilities were 500 L/m$^2$/s, 550 L/m$^2$/s, and 1,617 L/m$^2$/s at 200 Pa, and the average sound absorption rates were 0.64, 0.55, and 0.52 at 200 to 1,600 Hz.

When the through-holes were formed to have an average diameter of 43.0 μm as in Comparative Example 1, the air permeability (internal air resistance) was 3,690 L/m$^2$/s at 200 Pa, and the average sound absorption rate was 0.43 at 200 to 1,600 Hz.

Further, when the through-holes in the sound-absorbing layers formed of polyester fibers were formed to have average diameters of 19.9 μm, 21.9 μm, and 36.7 μm, respectively, as in Examples 4 to 6, the air permeabilities were 455 L/m$^2$/s, 472 L/m$^2$/s, and 1,825 L/m$^2$/s at 200 Pa, and the average sound absorption rates were 0.63, 0.59, and 0.53 at 200 to 1,600 Hz.

When the through-holes were formed to have an average diameter of 43.0 μm as in Comparative Example 2, the air permeability (internal air resistance) was 2,520 L/m$^2$/s at 200 Pa, and the average sound absorption rate was 0.48 at 200 to 1,600 Hz.

Also, when the through-holes in the sound-absorbing layers formed of polyester fibers were formed to have average diameters of 19.9 μm, 21.9 μm, and 36.7 μm, respectively, as in Examples 7 to 9, the air permeabilities were 375 L/m$^2$/s, 412 L/m$^2$/s, and 1,895 L/m$^2$/s at 200 Pa, and the average sound absorption rates were 0.57, 0.55, and 0.42 at 200 to 1,600 Hz.

When the through-holes were formed to have an average diameter of 43 μm as in Comparative Example 3, the air permeability (internal air resistance) was 2,322 L/m$^2$/s at 200 Pa, and the average sound absorption rate was 0.39 at 200 to 1,600 Hz.

Figure 3:
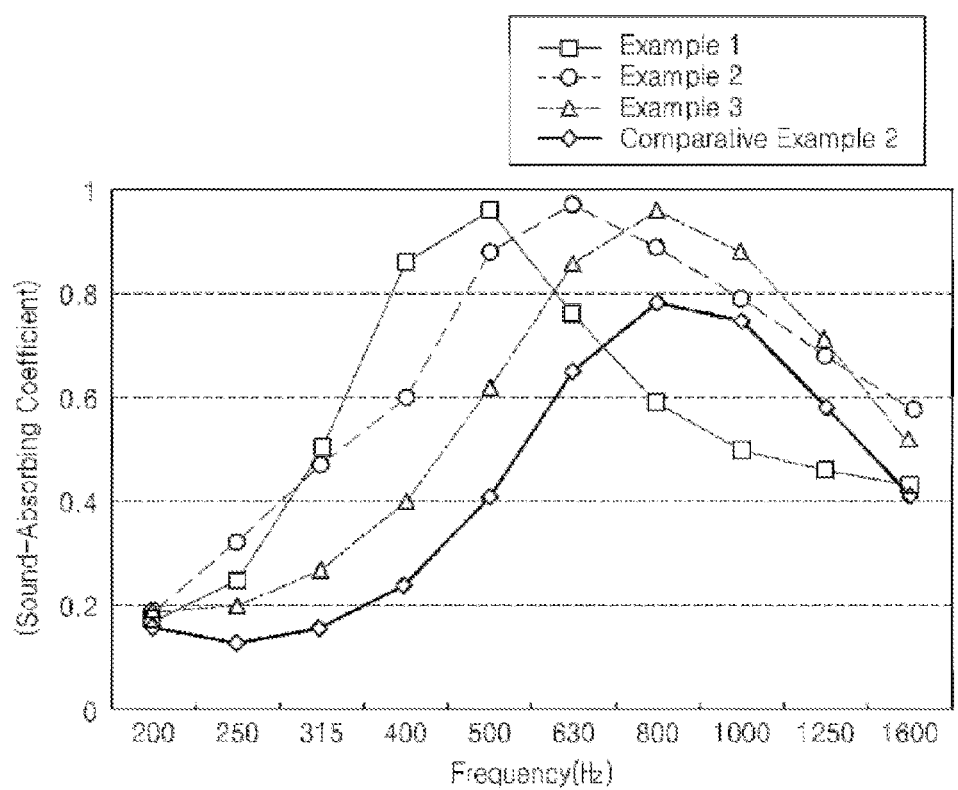
FIG. 3 is a graph depicting test results based on Table 1.

FIG. 3 is a graph depicting test results based on Table 1. The test results will be described in more detail with reference to FIG. 3.

Referring to FIG. 3, it can be seen from comparison of Examples 1 to 3 with Comparative Example 1 that the sound absorption rate in a low frequency band of 500 Hz or less was remarkably increased.

According to the test results, when the through-holes are formed to have an average diameter of 10 μm to 40 μm, it can be seen that the sound absorption rate in the low frequency band can be increased while increasing the average sound absorption rate. Here, it can be seen that the gypsum panel 100 according to the examples of the present invention has an air permeability of 100 to 2,000 L/m$^2$/s at 200 Pa.

As described above, the gypsum panel having outstanding sound-absorbing properties according to the embodiments of the present invention may effectively absorb sound waves in a low frequency band of 500 Hz or less as well as in a high frequency band.

Further, the gypsum panel having outstanding sound-absorbing properties according to the embodiments of the present invention may exhibit improved aesthetics by printing the pattern on the sound-absorbing cover layer in various ways.

Although some embodiments have been described herein, it will be understood by those skilled in the art that these embodiments are provided for illustration only, and various modifications, changes, alterations and equivalent examples can be made without departing from the scope of the present invention. Therefore, the scope and sprit of the present invention should be defined only by the accompanying claims and equivalents thereof.

The invention claimed is:

1. A gypsum panel having sound-absorbing properties, the gypsum panel comprising:
   a perforated gypsum body having a plurality of holes; and
   a sound-absorbing cover layer attached to one side of the gypsum body and having through-holes of a smaller size than the holes, the through-holes having an average diameter of 10 μm to 40 μm, wherein at least one of the holes of the perforated gypsum body is overlapped with at least one of the through-holes of the sound-absorbing cover layer, and the overlapped holes are extended through an entire thickness of the gypsum panel.

2. The gypsum panel according to claim 1, wherein the sound-absorbing cover layer is a non-woven fabric formed of at least one of glass fiber, polyester fiber, and pulp.

3. The gypsum panel according to claim 1, wherein the gypsum body includes a gypsum board and a finishing material attached to one or both sides of the gypsum board.

4. The gypsum panel according to claim 1, wherein the gypsum body is a finished tile.

5. The gypsum panel according to claim 1, wherein the holes have an average diameter of 0.5 mm to 20 mm.

6. The gypsum panel according to claim 1, wherein the sound-absorbing cover layer comprises a finishing layer having a pattern printed on an outer surface thereof.

7. The gypsum panel according to claim 1, wherein the gypsum panel has an air permeability of 100 L/m²/s to 2,000 L/m²/s at 200 Pa.

8. The gypsum panel according to claim 1, wherein one side of the sound-absorbing cover layer is attached to the one side of the gypsum body, and the other side of the sound-absorbing cover layer is disposed to face a ceiling or a wall of a building.

9. A method of manufacturing a gypsum panel having sound-absorbing properties, the method comprising:

preparing a perforated gypsum body having a plurality of holes; and attaching a sound-absorbing cover layer to one side of the gypsum body, the sound-absorbing cover having through-holes of a smaller size than the holes, wherein the through-holes have an average diameter of 10 μm to 40 μm and the holes have an average diameter of 0.5 mm to 20 mm, and wherein at least one of the holes of the perforated gypsum body is overlapped with at least one of the through-holes of the sound-absorbing cover layer, and the overlapped holes are extended through an entire thickness of the gypsum panel.

10. The method according to claim 9, wherein the sound-absorbing cover layer is a non-woven fabric formed of at least one of glass fiber, polyester fiber, and pulp.

11. The method according to claim 9, further comprising:
printing a pattern on an outer surface of the sound-absorbing layer to form a finishing layer after said attaching the sound-absorbing layer to the one side of the gypsum body.

12. The method according to claim 9, further comprising:
directly printing a pattern on the sound-absorbing cover layer by partially coating a non-woven fabric with a polyvinyl chloride (PVC) sol.

13. The gypsum panel according to claim 1, wherein the sound-absorbing cover layer comprises:
a non-woven fabric; and
a pattern of polyvinyl chloride (PVC) directly and partially coated on the non-woven fabric.

* * * * *